US012803648B2

(12) United States Patent
Liu et al.

(10) Patent No.: US 12,803,648 B2
(45) Date of Patent: Nov. 17, 2026

(54) WIRELESS COMMUNICATION METHODS FOR NETWORK-CONTROLLED REPEATER ACCESS CONTROL, APPARATUS, AND COMPUTER-READABLE MEDIUM

(71) Applicant: ZTE Corporation, Shenzhen (CN)

(72) Inventors: Zhuang Liu, Shenzhen (CN); Dapeng Li, Shenzhen (CN); Yansheng Liu, Shenzhen (CN); Yin Gao, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 261 days.

(21) Appl. No.: 18/724,162

(22) PCT Filed: Sep. 27, 2022

(86) PCT No.: PCT/CN2022/121801
§ 371 (c)(1),
(2) Date: Jun. 25, 2024

(87) PCT Pub. No.: WO2024/065193
PCT Pub. Date: Apr. 4, 2024

(65) Prior Publication Data

US 2025/0150155 A1 May 8, 2025

(51) Int. Cl.
*H04W 24/02* (2009.01)
*H04B 7/155* (2006.01)

(52) U.S. Cl.
CPC .................................... *H04B 7/155* (2013.01)

(58) Field of Classification Search
None
See application file for complete search history.

(56) References Cited

U.S. PATENT DOCUMENTS

| | | | | |
|---|---|---|---|---|
| 2022/0053433 | A1 | 2/2022 | Abedini et al. | |
| 2025/0392373 | A1 * | 12/2025 | Chen .................. | H04B 7/15507 |
| 2026/0019969 | A1 * | 1/2026 | Yang ................... | H04W 56/004 |
| 2026/0032491 | A1 * | 1/2026 | Li ......................... | H04W 24/10 |
| 2026/0082343 | A1 * | 3/2026 | Talukdar ............... | H04L 5/0023 |

FOREIGN PATENT DOCUMENTS

| | | |
|---|---|---|
| CN | 114731571 A | 7/2022 |

OTHER PUBLICATIONS

International Search Report and Written Opinion for International Application No. PCT/CN2022/121801, mailed Jun. 2, 2023.
[No Author Listed], On side control information for network controlled repeaters (NCR). Qualcomm Inc., 3GPP TSG RAN WGI #109-e R1-2202047. May 20, 2022;1-13.
Huawei et al., Discussion on side control information to enable NR network-controlled repeaters. 3GPP TSG-RAN WGJ Meeting #109-e R1-2203133, May 20, 2022;1-11.

* cited by examiner

*Primary Examiner* — Minh Trang T Nguyen
(74) *Attorney, Agent, or Firm* — Vivacqua Crane, PLLC

(57) ABSTRACT

A wireless communication method includes transmitting, by a first wireless communication node. Network-Controlled Repeater (NCR) support information to a second wireless communication node; and receiving NCR configuration information, by the first wireless communication node from the second wireless communication node.

20 Claims, 5 Drawing Sheets

WIRELESS COMMUNICATION METHODS FOR NETWORK-CONTROLLED REPEATER ACCESS CONTROL, APPARATUS, AND COMPUTER-READABLE MEDIUM

CROSS-REFERENCE TO RELATED APPLICATION

This application is a national stage filing under 35 U.S.C. § 371 of international application number PCT/CN2022/121801, filed Sep. 27, 2022, the contents of which are incorporated herein by reference in its entirety.

TECHNICAL FIELD

This disclosure is generally related to wireless communication systems of Network-Controlled Repeaters (NCRs), and more particularly to NCR access control.

BACKGROUND

Wireless communication technologies are pivotal components of the increasingly interconnecting global communication networks. Wireless communications rely on accurately allocated time and frequency resources for transmitting and receiving wireless signals.

Network Controlled Repeaters (NCRs) can be used in the new generation of wireless communication system, such as a fifth generation (5G) system. NCRs can not only simply repeat the signals to extend the coverage of the wireless communication, but also implement more delicate communication function with smart control strategy and functionality. However, to implement the NCR in a wireless communication system with a base station divided into Centralized Unit (CU) and Distributed Unit (DU) is a technical issue unresolved by the industry.

SUMMARY

This summary is a brief description of certain aspects of this disclosure. It is not intended to limit the scope of this disclosure.

An aspect of this disclosure provides a wireless communication method, which may include:

- transmitting, by a first wireless communication node, Network-Controlled Repeater (NCR) support information to a second wireless communication node; and
- receiving NCR configuration information, by the first wireless communication node from the second wireless communication node, wherein the NCR support information comprises at least one of:
  - an indication on whether one or more cells of the first wireless communication node have capability to support NCR access;
  - one or more indications on whether the one or more cells of the first wireless communication node respectively have capability to support NCR access;
  - a list of one or more cells of the first wireless communication node that have capability to support NCR access; or
  - a list of one or more cells of the first wireless communication node that have no capability to support NCR access.

Another aspect of this disclosure provides a wireless communication method, which may include:

- transmitting, by a first wireless communication node, Network-Controlled Repeater (NCR) support information to a second wireless communication node; and
- receiving NCR configuration information, by the first wireless communication node from the second wireless communication node, wherein the NCR configuration information includes at least one of:
  - an indication on whether NCR access is allowed to one or more cells of the first wireless communication node;
  - one or more indications on whether NCR access is respectively allowed to the one or more cells of the first wireless communication node;
  - a list of one or more cells of the first wireless communication node that are allowed to have NCR access; or
  - a list of one or more cells of the first wireless communication node that are prohibited to have NCR access.

Still another aspect of this disclosure provides a wireless communication method, which may include:

- receiving a Network-Controlled Repeater (NCR) support information from a first wireless communication node by a second wireless communication node; and
- transmitting NCR configuration information, by the second wireless communication node, to the first wireless communication node, wherein the NCR configuration information includes at least one of:
  - an indication on whether NCR access is allowed to one or more cells of the first wireless communication node;
  - one or more indications on whether NCR access is respectively allowed to the one or more cells of the first wireless communication node;
  - a list of one or more cells of the first wireless communication node that are allowed to have NCR access; or
  - a list of one or more cells of the first wireless communication node that are prohibited to have NCR access.

Still another aspect of this disclosure provides a wireless communication method, which may include:

- receiving a Network-Controlled Repeater (NCR) support information a from first wireless communication node by a second wireless communication node; and
- transmitting NCR configuration information, by the second wireless communication node, to the first wireless communication node, wherein the NCR support information comprises at least one of:
  - an indication on whether one or more cells of the first wireless communication node have capability to support NCR access;
  - one or more indication on whether the one or more cells of the first wireless communication node respectively have capability to support NCR access;
  - a list of one or more cells of the first wireless communication node that have capability to support NCR access; or
  - a list of one or more cells of the first wireless communication node that have no capability to support NCR access.

Still another aspect of this disclosure provides a wireless communication method, which may include:

- receiving, by an NCR device, cell NCR access information from one or more cells of a first wireless communication node;

sending, by the NCR device, an NCR indication information, indicating an identity of the NCR device, to at least one of the first wireless communication node or a second wireless communication node configured to select an AMF; and establishing connection between the NCR device and a selected cell of the one or more cells according to the NCR indication information.

Still another aspect of this disclosure provides a wireless communication apparatus, which may include one or more memory storing one or more programs and one or more processors electrically coupled to the memory and configured to execute the one or more programs to perform any method or step or their combination in this disclosure.

Still another aspect of this disclosure provides non-transitory computer-readable storage medium, storing one or more programs, the one or more program being configured to, when executed by one or more processors, cause to perform any method or step or their combination in this disclosure.

The above and other aspects and their implementations are described in greater detail in the drawings, the descriptions, and the claims.

BRIEF DESCRIPTION OF DRAWINGS

Various exemplary embodiments of the present disclosure are described in detail below with reference to the following drawings. The drawings are provided for purposes of illustration only and merely depict exemplary embodiments of the present disclosure to facilitate the understanding of the present disclosure. Therefore, the drawings should not be considered as limiting of the breadth, scope, or applicability of the present disclosure. It should be noted that for clarity and ease of illustration these drawings are not necessarily drawn to scale.

DETAILED DESCRIPTION

Figure 5:
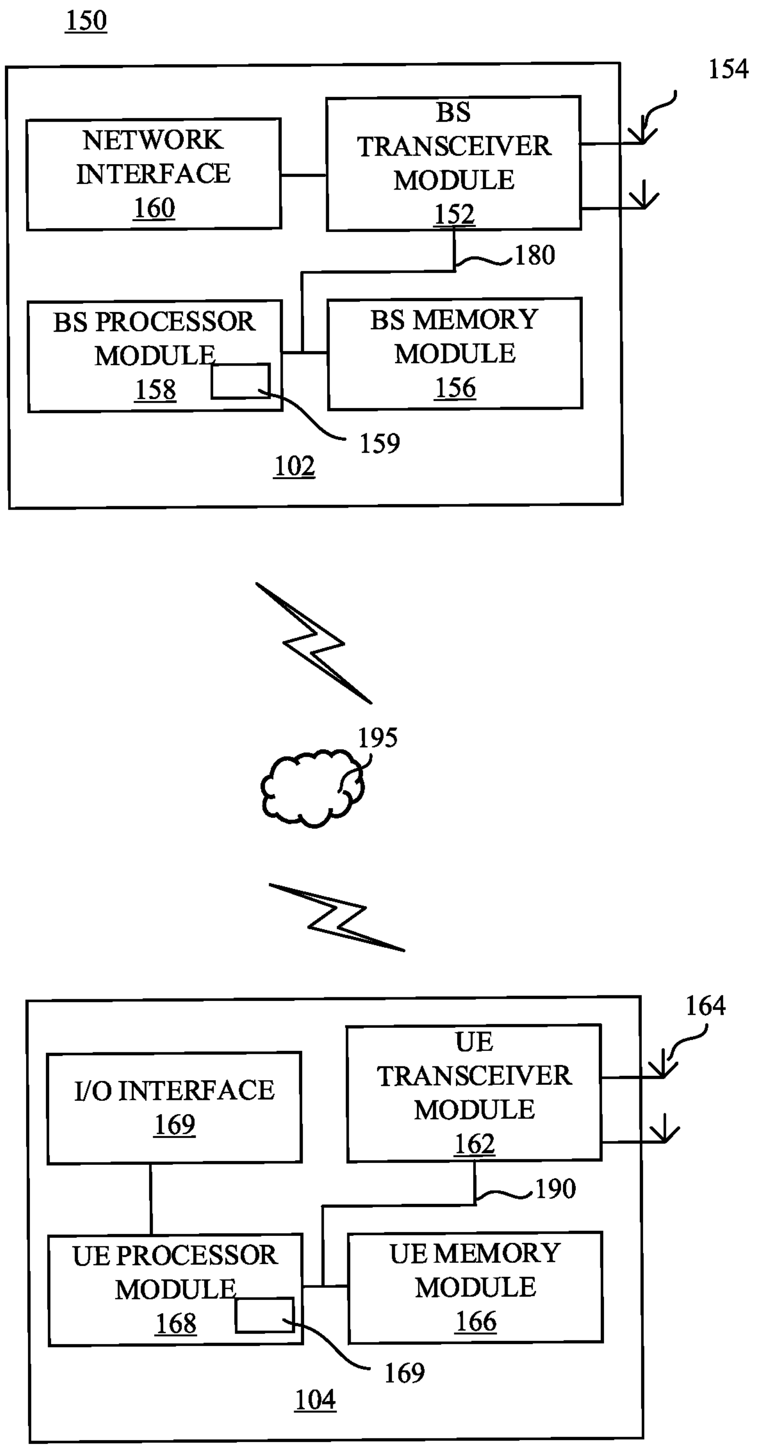
FIG. 5 shows an exemplary wireless communication system, which can implement the methods and/or steps in this disclosure.

FIG. 5 illustrates a block diagram of an exemplary wireless communication system 150, in accordance with some embodiments of this disclosure. The system 150 may perform the various methods/steps disclose below. The system 150 may include components and elements configured to support operating features that need not be described in detail herein.

The system 150 may include a base station (BS) 102 and a user equipment (UE) 104. The BS 102 includes a BS transceiver or transceiver module 152, a BS antenna system 154, a BS memory or memory module 156, a BS processor or processor module 158, and a network interface 160. The components of BS 102 may be electrically coupled and in communication with one another as necessary via a data communication bus 180. Likewise, the UE 104 includes a UE transceiver or transceiver module 162, a UE antenna system 164, a UE memory or memory module 166, a UE processor or processor module 168, and an I/O interface 169. The components of the UE 104 may be electrically coupled and in communication with one another as necessary via a date communication bus 190. The BS 102 communicates with the UE 104 via a communication channel 192, which can be any wireless channel or other medium known in the art suitable for transmission of data as described herein.

As would be understood by persons of ordinary skill in the art, the system 150 may further include any number of modules other than the modules shown in FIG. 5. Those having ordinary skill in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software depends upon the particular application and design constraints imposed on the overall system. Those familiar with the concepts described herein may implement such functionality in a suitable manner for each particular application, but such implementation decisions should not be interpreted as limiting the scope of the present disclosure.

A wireless transmission from a transmitting antenna of the UE 104 (referred to singular form for convenience, but can include multiple antennae) to a receiving antenna of the BS 102 (referred to singular form for convenience, but can include multiple antennae) is known as an uplink (UL) transmission, and a wireless transmission from a transmitting antenna of the BS 102 to a receiving antenna of the UE 104 is known as a downlink (DL) transmission. In accordance with some embodiments, the UE transceiver 162 may be referred to herein as an "uplink" transceiver 162 that includes a RF transmitter and receiver circuitry that are each coupled to the UE antenna 164. A duplex switch (not shown) may alternatively couple the uplink transmitter or receiver to the uplink antenna in time duplex fashion. Similarly, in accordance with some embodiments, the BS transceiver 152 may be referred to herein as a "downlink" transceiver 152 that includes RF transmitter and receiver circuitry that are each coupled to the antenna array 154. A downlink duplex switch may alternatively couple the downlink transmitter or receiver to the downlink antenna array 154 in time duplex fashion. The operations of the two transceivers 152 and 162 are coordinated in time such that the uplink receiver is coupled to the uplink UE antenna 164 for reception of transmissions over the wireless communication channel 192 at the same time that the downlink transmitter is coupled to the downlink antenna array 154. There may be close synchronization timing with only a minimal guard time between changes in duplex direction. The UE transceiver 162 communicates through the UE antenna 164 with the BS 102 via the wireless communication channel 192. The BS transceiver 152 communicates through the BS antenna 154 of a BS (e.g., the first BS 102) with the other BS (e.g., the second BS 102-2) via a wireless communication channel 192. The wireless communication channel 196 can be any wireless channel or other medium known in the art suitable for direct communication between BSs.

The UE transceiver 162 and the BS transceiver 152 are configured to communicate via the wireless data communication channel 192, and cooperate with a suitably configured RF antenna arrangement 154/164 that can support a particular wireless communication protocol and modulation scheme. In some exemplary embodiments, the UE transceiver 162 and the BS transceiver 152 are configured to support industry standards such as the Long-Term Evolution (LTE) and 5G standards (e.g., NR), and the like. It is understood, however, that the invention is not necessarily limited in application to a particular standard and associated protocols. Rather, the UE transceiver 162 and the BS transceiver 152 may be configured to support alternative, or additional, wireless data communication protocols, including future standards or variations thereof.

The processor modules 158 and 168 may be implemented, or realized, with a general-purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor module may be realized as a microprocessor, a controller, a microcontroller, a state machine, or the like. A processor module may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the embodiments disclosed herein may be embodied directly in hardware, in firmware, in a software module executed by processor modules 158 and 168, respectively, or in any practical combination thereof. The memory modules 156 and 166 may be realized as RAM memory, flash memory, ROM memory, EPROM memory, EEPROM memory, registers, a hard disk, a removable disk, a CD-ROM, or any other form of storage medium known in the art. In this regard, the memory modules 156 and 166 may be coupled to the processor modules 158 and 168, respectively, such that the processors modules 158 and 168 can read information from, and write information to, memory modules 156 and 166, respectively. The memory modules 156 and 166 may also be integrated into their respective processor modules 158 and 168. In some embodiments, the memory modules 156 and 166 may each include a cache memory for storing temporary variables or other intermediate information during execution of instructions to be executed by processor modules 158 and 168, respectively. The memory modules 156 and 166 may also each include non-volatile memory for storing instructions to be executed by the processor modules 158 and 168, respectively.

The network interface 160 generally represents the hardware, software, firmware, processing logic, and/or other components of the base station 102 that enable bi-directional communication between BS transceiver 152 and other network components and communication nodes configured to communication with the BS 102. For example, network interface 160 may be configured to support internet or WiMAX traffic. In a typical deployment, without limitation, network interface 160 provides an 802.3 Ethernet interface such that BS transceiver 152 can communicate with a conventional Ethernet based computer network. In this manner, the network interface 160 may include a physical interface for connection to the computer network (e.g., Mobile Switching Center (MSC)) or one or more core network 195 for mobile communications. The terms "configured for" or "configured to" as used herein with respect to a specified operation or function refers to a device, component, circuit, structure, machine, signal, etc. that is physically constructed, programmed, formatted and/or arranged to perform the specified operation or function. The network interface 160 could allow the BS 102 to communicate with other BSs or a CN over a wired or wireless connection.

Figure 1:
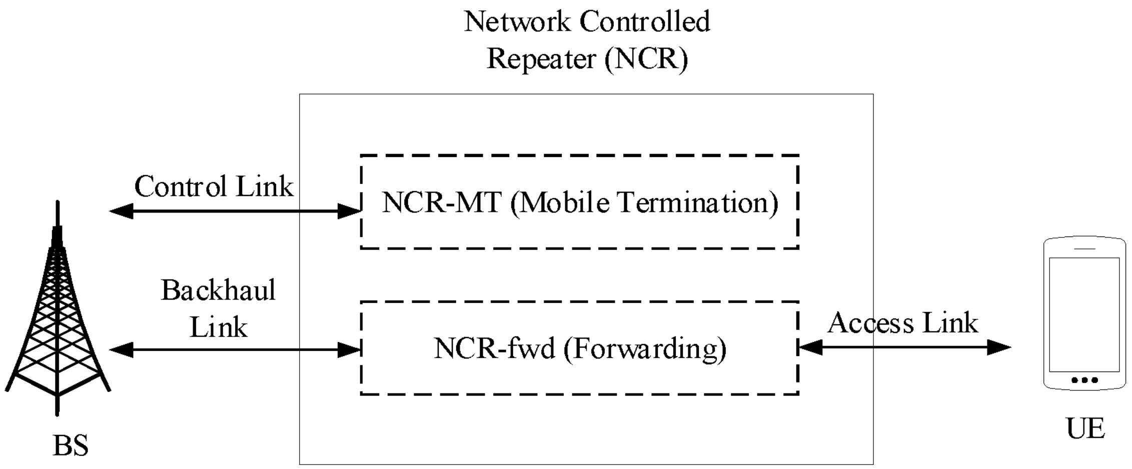
FIG. 1 illustrates a wireless communication system with NCR.

In a fifth generation (5G) network, a Network-Controlled Repeater (NCR) can be an enhanced device over conventional RF (Radio Frequency) repeaters with the capability to receive and process control information from the network. The exemplary model of NCR is shown in FIG. 1.

The NCR may include two function entities: NCR-MT (NCR Mobile Termination) and NCR-Fwd (NRC Forwarding). The responsibility of NCR-MT includes establishing control link connection between the NCR and the base station (BS or gNB) over a Uu interface, so that the NCR can receive control configuration from the gNB. The responsibility of NCR-Fwd includes performing amplify and forwarding of uplink and downlink (UL/DL) RF signals between gNB and user equipment (UE) via the backhaul link and the access link. While the behavior of the NCR-Fwd can be controlled according to the received control information from the gNB, its basic functionality is similar to traditional RF-repeaters.

In a 5G system, an NCR can be regarded as the wireless device like a special UE. An NCR first needs to access gNB as a kind of UEs, and then other regular UEs can be connected to the NRC device for UL/DL RF signal transmission between the NCR and UE. The 5G base station (e.g., gNB) can be divided into two physical entities, gNB-CU (Centralized Unit) and gNB-DU (Distributed Unit). The gNB-CU may provide support for the higher layers of the protocol stack such as SDAP (Service Data Adaption Protocol), PDCP (Packet Data Convergence Protocol) and RRC (Radio Resource Control), while gNB-DU may provide support for the lower layers of the protocol stack such as RLC (Radio Link Control), MAC (Medium Access Control), and Physical layer.

When a base station (BS or gNB) is divided into a CU (Centralized Unit)/DU (Distributed Unit) structure, the base station cannot well support the access of NCR (Network-Controlled Repeater) devices if certain information is not given. For example, a gNB-CU does not know whether a gNB-DU supports the access of NCR devices or not, so the gNB-CU cannot decide whether an NCR device is allowed to access one or more cells on the gNB-DU. The gNB-DU and gNB-CU may also need to know whether the accessing device is an NCR device or regular user equipment (UE), such as a cell phone, so as to determine whether to use the specific scheduling transmission strategy for the accessing device. Furthermore, the gNB-CU may also need to inform the core network whether the accessing device is an NCR device or regular UE, then the core network can perform the authorization of the NCR device.

This disclosure relates to methods, devices, and computer-readable storage medium to control the access of NCR devices to a wireless communication system.

NCR Configuration and NCR Access Control

First aspects, among others, of this disclosure provides methods to coordinate the access control and provide information needed for access control of an NCR between a DU and CU of a base station.

An embodiment of this disclosure provides a wireless communication method, including:

transmitting, by a first wireless communication node (e.g., a gNB-DU), Network-Controlled Repeater (NCR) support information to a second wireless communication node (e.g., a gNB-CU); and receiving NCR configuration information, by the first wireless communication node from the second wireless communication node.

Correspondingly, an embodiment of this disclosure provide a wireless communication method, including:

receiving a Network-Controlled Repeater (NCR) support information from a first wireless communication node (e.g., a gNB-DU) by a second wireless communication node (e.g., a gNB-CU); and transmitting NCR configuration information, by the second wireless communication node, to the first wireless communication node.

Exemplarily, the NCR support information comprises at least one of:

an indication on whether one or more cells of the first wireless communication node have capability to support NCR access;

one or more indications on whether the one or more cells of the first wireless communication node respectively have capability to support NCR access;

a list of one or more cells of the first wireless communication node that have capability to support NCR access; or a list of one or more cells of the first wireless communication node that have no capability to support NCR access.

Exemplarily, the NCR configuration information includes at least one of:

an indication on whether NCR access is allowed to the one or more cells of the first wireless communication node;

one or more indications on whether NCR access is respectively allowed to the one or more cells of the first wireless communication node;

a list of one or more cells of the first wireless communication node that are allowed to have NCR access; or a list of one or more cells of the first wireless communication node that are prohibited to have NCR access.

Figure 2:
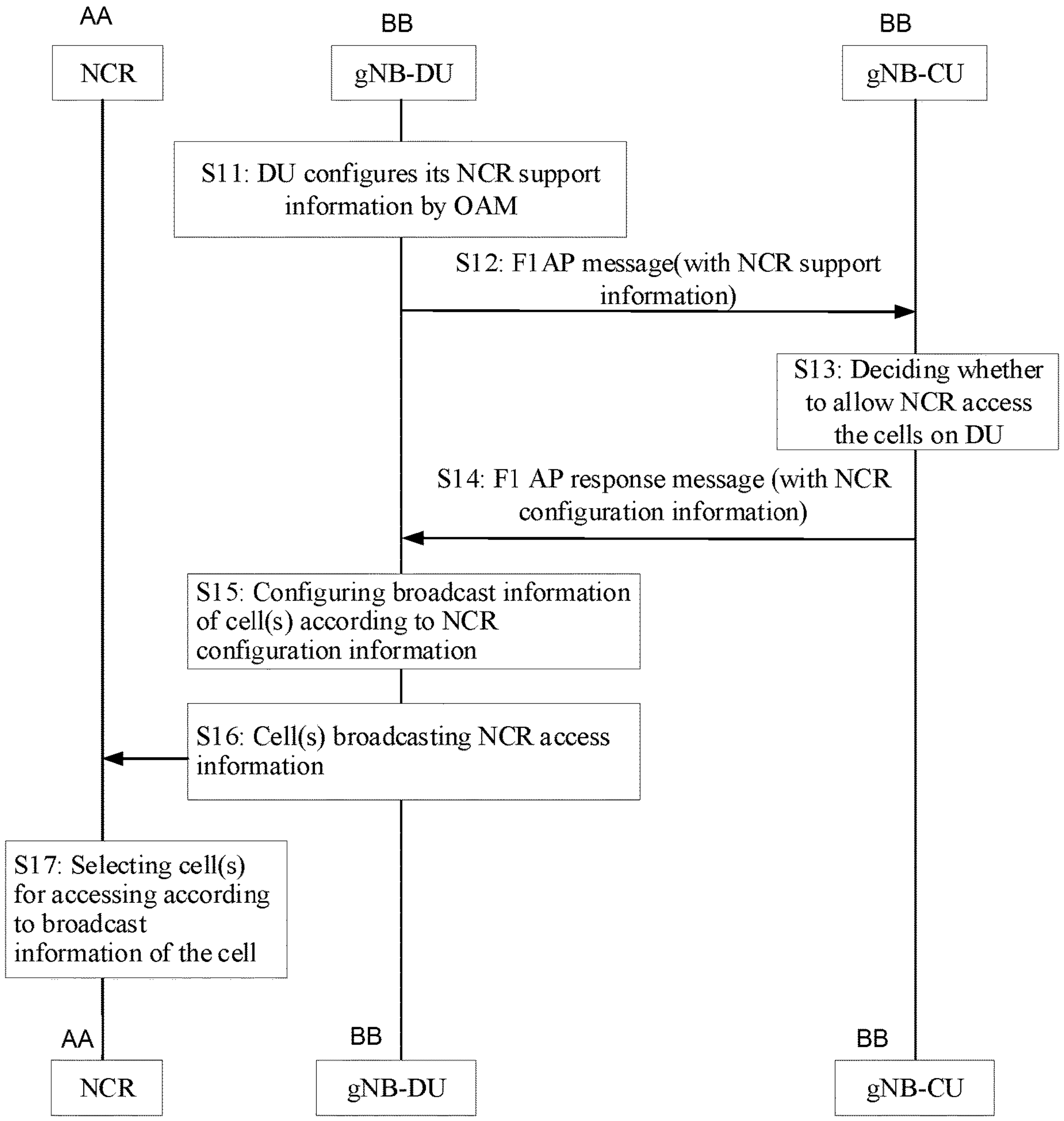
FIG. 2 illustrates steps to configure NCR access according to one exemplary embodiment of this disclosure.

FIG. 2 illustrates steps for the access control of an NCR device. This disclose explains the steps in FIG. 2 as follows.

S11: The gNB-DU can decide how and whether to support NCR access by itself; for example, the gNB-DU can decide whether the entire gNB-DU supports NCR device access based on OAM (Operations, Administration and Maintenance) configuration. In this approach, the support of NCR device access can be determined on a per gNB-DU level; Alternatively, the accessibility of the NCR to the gNB-DU can be determined on a cell by cell basis, meaning that the gNB-DU can determine which cell(s) on it support NCR access or which cell(s) do not support the access.

S12: If the F1 interface between the CU and DU has not been established, the gNB-DU can send a F1 SETUP REQUEST message to the gNB-CU to request to setup the F1 interface between the gNB-DU and the gNB-CU. NCR support information may be included in the F1 SETUP REQUEST message.

Alternatively and optionally, if the F1 interface has been established, the gNB-DU can send GNB-DU Configuration UPDATE message to the gNB-CU to inform the DU's updated configuration on the NCR accessibility, meaning that the GNB-DU Configuration UPDATE message may include the NCR support information.

That is, according to one embodiment of this disclosure, the NCR support information is transmitted in a F1 interface setup request message, F1AP gNB-DU (Distributed Unit) configuration update message, or a F1 Application Protocol (F1AP) message.

As an example, the NCR support information may include at least one of the following:

an indication on whether one or more cells of the first wireless communication node have capability to support NCR access, in a case that the accessibility of NCRs is determined on a per gNB-DU basis;

one or more indication on whether the one or more cells of the first wireless communication node respectively have capability to support NCR access, in a case that the accessibility of NCRs is determined on a cell by cell basis among the same gNB-DU;

a list of one or more cells of the first wireless communication node that have capability to support NCR access; or a list of one or more cells of the first wireless communication node that have no capability to support NCR access.

S13: After receives the NCR support information from the gNB-DU, the gNB-CU can be aware of which cell(s) on the DU can support NCR device access, and which cell(s) cannot. For the cell(s) which can support NCR access, the gNB-CU can decide whether to allow NCR access to this cell(s). For example, if the cell has a heavy loading, even if the cell can support NCR access, the gNB-CU can decide to not allow NCR access in this cell based on congestion control schemes.

S14: After the determining, the gNB-CU may send the response message to the gNB-DU, e.g., F1 SETUP RESPONSE message or GNB-DU CONFIGURATION UPDATE ACKNOWLEDGE message, or GNB-CU CONFIGURATION UPDATE REQUEST message. The response message may include the NCR configuration information. According to one embodiment of this disclosure, the NCR configuration information can be received from a F1 interface setup response message, gNB-DU configuration update acknowledge message, gNB-CU configuration update message, or a F1 Application Protocol (F1AP) message.

Exemplarily, the NCR configuration information may include at least one of the following:

an indication on whether NCR access is allowed to one or more cells of the first wireless communication node, in a case that the gNB-CU determines the accessibility of NCR devices to the gNB-DU on a per gNB-DU basis;

one or more indications on whether NCR access is respectively allowed to the one or more cells of the first wireless communication node, in a case that the accessibility of NCRs is determined on a cell by cell basis among the same gNB-DU;

a list of one or more cells of the first wireless communication node that are allowed to have NCR access; or a list of one or more cells of the first wireless communication node that are prohibited to have NCR access.

According to one embodiment of this disclosure, the wireless communication method further includes configuring whether NCR access is allowed to one or more cells of the gNB-DU by broadcasting information according to the NCR configuration information to trigger the one or more cells to broadcast cell NCR access information to one or more NCR devices for the one or more NCR devices to select an NCR-accessible cell.

S15: The gNB-DU may configure whether NCR devices are allowed to access one or more cells by broadcast information of this cell on the gNB-DU according to the received NCR configuration information. In a case that the gNB-DU does not receive the NCR configuration information from the gNB-CU in a determined time window, the gNB-DU may make its own determination in replace of the NCR configuration information by the gNB-DU itself. For example, the DU may detect the cell load of a cell is high, and DU decides the cell is bared from the access of NCR devices.

S16: According to one embodiment of this disclosure, the wireless communication method further includes broadcasting cell NCR access information, by the one or more cells, to indicate to one or more NCR devices of whether the one or more cells are accessible by the NCR devices.

In this step, the cell(s) of the gNB-DU may broadcast to NCR devices whether the specific cell(s) are allowed for NCR access. The broadcasted cell NCR access information can indicate the NCR devices whether a specific cell or a group of cells are allowed for the NCR device to access. Based on the broadcasted cell NCR access information an NCR device may select the proper cell to connect with.

S17: According to one embodiment of this disclosure, the wireless communication method further comprises selecting one of the one or more cells that are NCR accessible according to cell NCR access information to access by an NCR device.

In this step, an NCR device receives the broadcasted NCR access information of one or more cell(s) of the gNB-D can select a cell that allows NCR access to access based on the broadcasted NCR access information.

In one embodiment, the NCR device may send an NCR indication information to the cell, the gNB-D, the gNB-C, or the core network. The NCR indication information may be used to identify the identity of the NCR device, or used to identify that the device attempting to access the cell is an NCR device as distinguished from a regular UE, such as a cell phone of an end user. The NCR indication information can be used by the cell, the gNB-D, the gNB-C, or the core network for scheduling purpose to adopt a proper process for the communication with an NCR device.

In the above procedure, the gNB-D can send the NCR support information to the gNB-C in the example messages disclosed above, such that the gNB-C can understand whether the one or more cells of the gNB-D support the access of an NCR devices, collectively or respectively. The gNB-C can send a response, including the NCR configuration information, in the example messages disclosed above. The NCR configuration information may include the gNB-C's control of the NCR accessibility of the one or more cells. For example, the gNB-C may ban the access of NCR devices to certain cell(s) of the gNB-D based on different factors, such as the loading of the cells, even if the certain cells have the capacity to be connected with an NCR device. Based on the NCR configuration information, the gNB-D may configure its one or more cells with respect to their NCR accessibility. The one or more cells may thereby broadcast the cell NCR access information, which can be used to indicated, to potential NCR devices, whether a certain cell or cells as a group are accessible by NCR devices. Thereby, the NCR devices may select a proper cell or cells to get connected with based on the accessibility information of the cell NCR access information.

NCR Device Access Procedure-1

Figure 3:
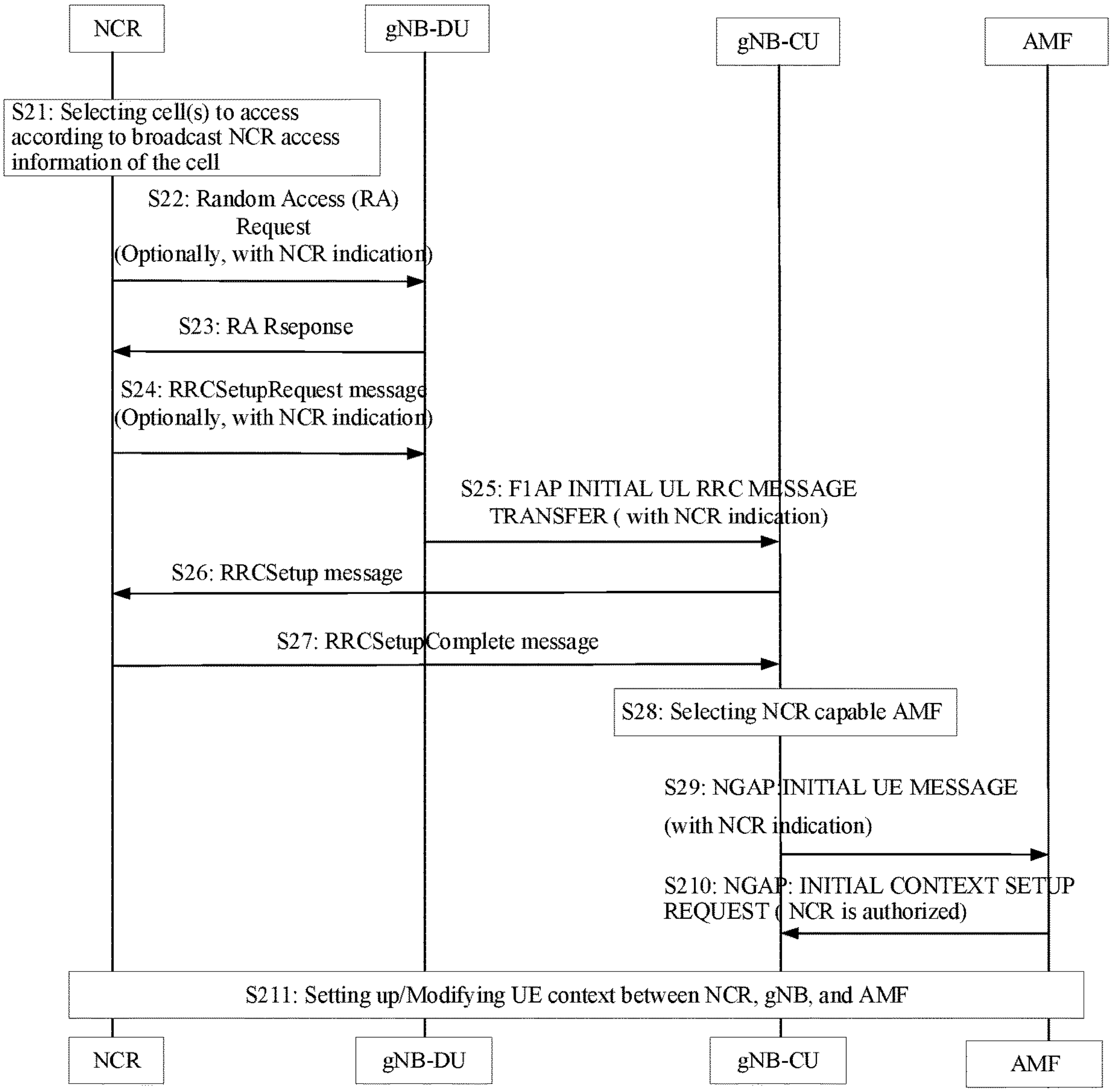
FIG. 3 illustrates steps for an NCR device to establish connection according to first example of this disclosure.

This disclosure, as shown in FIG. 3, below provides a first example illustrating the procedure of an NCR device accessing the cell and the corresponding example steps of the base station and core network.

An embodiment of this disclosure provides a wireless communication method, including:

receiving, by an NCR device, cell NCR access information from one or more cells of a first wireless communication node;

sending, by the NCR device, an NCR indication information, indicating an identity of the NCR device, to at least one of the first wireless communication node or a second wireless communication node configured to select an AMF; and establishing connection between the NCR device and a selected cell of the one or more cells according to the NCR indication information.

S21: In this step, the NCR device may receive the broadcast cell NCR access information of one or more cell(s). As explained above, the NCR device may select a cell that is NCR accessible, according to the cell's broadcasted information, to access.

S22: After the selection of the cell to access, the NCR device may send Random Access (RA) request message with a preamble to the selected cell of the gNB-DU for random accessing. The RA request may include an NCR indication information in the message. Exemplarily, the NCR indication information can be used to indicate the accessing device is an NCR device or to indicate the UE type is NCR.

S23: The gNB-DU may send Random Access response message to the NCR in response to the RA request from the NCR device.

S24: The NCR device then may send RRC (Radio Resource Control) connection setup request message to the gNB-DU to request establishment of RRC connection in the selected cell. Exemplarily, the RRC connection setup request message may include the NCR indication information. The NCR indication information can be used to indicate the accessing device is an NCR device or to indicate the UE type is NCR.

After Step S24, the gNB-DU may be aware of the accessing device is an NCR device as contrary to the regular UE after it receives the NCR indication information from the NCR-type UE. If the subsequent UE context setup/modification procedure is successfully complete, the gNB-DU can use a specific scheduling transmission strategy for the NCR device according to the understanding provided by the NCR indication information.

Additionally, it is optional for the NCR device to send the NCR indication information in step S23 or step S24. If the NCR indication information has been sent in step S23, NCR device does not need to send it in step S24 again. If NCR indication will be sent in step S24, NCR device does not need to send it in step S23.

S25: After receiving the NCR indication information from the NCR device, the gNB-DU may send an F1AP (F1 Application Protocol) message, e.g., an INITIAL UL RRC MESSAGE TRANSFER message, to the gNB-CU. The F1AP message may include the NCR indication information or corresponding information in the message. The NCR indication information can be used to indicate to the gNB-CU that the accessing device is an NCR device or to indicate the type of the UE is NCR.

S26: In this step, the gNB-CU may send an RRC Setup Request message to the NCR via the gNB-DU to setup the RRC connection between NCR and the gNB. That is, the RRC Setup Request message may first be sent to the gNB-DU and then transferred to the NCR by the gNB-DU.

S27: In this step, the NCR device may send an RRC Setup Complete message to the gNB-CU via the gNB-DU to complete the RRC connection setup procedure. The RRC Setup Complete message may first be sent to the gNB-DU and then transferred to the gNB-CU by the gNB-DU.

S28: After receives the RRC Setup Complete message from the NCR (via gNB-DU), since the gNB-CU is aware of the accessing device is an NCR device according to the received NCR indication information, the gNB-CU may select an AMF supporting NCR devices for the UE context establishment.

S29: After the selection, the gNB-CU may send an NGAP (NG Application Protocol) message, e.g., INITIAL UE MESSAGE, to the selected AMF, in order to request to setup UE context between the gNB and the 5G core network. The NGAP message may include the NCR indication information, where the NCR indication information can be used to indicate the accessing device is an NCR device or to indicate the UE type is NCR to the AMF.

S210: In a case that the NCR device is authorized by the selected AMF, the AMF may send the NGAP response message to the gNB-CU, e.g., INITIAL CONTEXT SETUP REQUEST message, to complete the UE context setup.

S211: Finally, the procedure of setting up the UE context between the NCR device, the base station (gNB), and the core network (AMF) is complete. It should be noted that a UE context modifying procedure can be done by the similar approach, with the NCR indication information embedded in the message(s) between the NCR device, the base station (gNB-DU and/or gNB-CU), and the core network (e.g. AMF). Such that the base station and the core network can understand that the accessing device is an NCR device, as contrary to a regular UE, or that the type of the UE is NCR.

According to the approach above, the NCR device can provide an NCR identification information to the base station or a component of the core network. The NCR identification information can be used to identify the type of the accessing device, such that the base station and the core network can understand that the accessing device is an NCR device, not a regular UE. Thereby, the base station and the core network may execute the appropriate procedure based on the identity of the accessing device.

NCR Device Access Procedure-2

Figure 4:
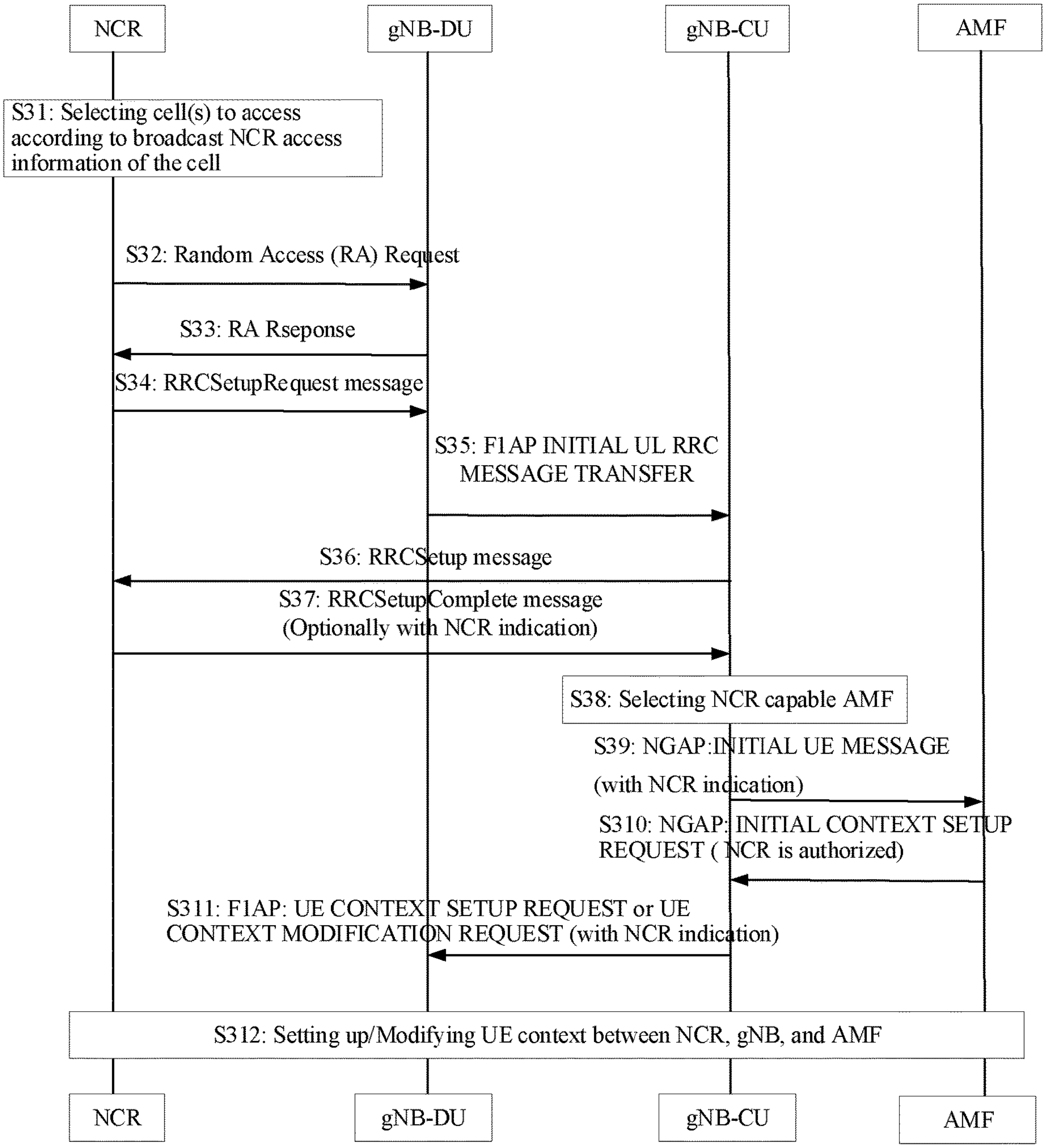
FIG. 4 illustrates steps for an NCR device to establish connection according to second example of this disclosure.

This disclosure, as shown in FIG. 4 below, provides a second example illustrating the procedure of an NCR device accessing the cell and the corresponding example steps of the base station and core network. The main difference in this embodiment as compared to the first example includes that, in this embodiment, the gNB-CU first receives the NCR identification information in advance of the gNB-DU. It should be noted that a UE context modifying procedure can be done by the similar approach, with the NCR indication information embedded in the message(s) between the NCR device, the base station (gNB-DU and/or gNB-CU), and the core network (e.g. AMF). Such that the base station and the core network can understand that the accessing device is an NCR device, as contrary to a regular UE, or that the type of the UE is NCR.

S31: In this step, the NCR device may receive the broadcast cell NCR access information of one or more cell(s). As explained above, the NCR device may select a cell that is NCR accessible according to the cell's broadcasted information, to access.

S32: After the selection of the cell to access, the NCR device may send Random Access (RA) request message with a preamble to the selected cell of the gNB-DU for random accessing.

S33: The gNB-DU may send Random Access response message to the NCR in response to the RA request from the NCR device.

S34: The NCR device then may send RRC (Radio Resource Control) connection setup request message to the gNB-DU to request establishment of RRC connection in the selected cell.

S35: After receives the NCR indication information from the NCR device, the gNB-DU may send an F1AP (F1 Application Protocol) message, e.g., an INITIAL UL RRC MESSAGE TRANSFER message, to the gNB-CU.

S36: If the gNB-CU can accept this NCR devices to access the selected cell, the gNB-CU may send an RRC Setup Request message to the NCR via the gNB-DU to setup the RRC connection between NCR and the gNB. That is, the RRC setup request message may first be sent to the gNB-DU and then transferred to the NCR by the gNB-DU.

S37: In this step, the NCR device may send an RRC Setup Complete message to the gNB-CU via the gNB-DU to complete the RRC connection setup procedure. The RRC Setup Complete message may first be sent to the gNB-DU and then transferred to the gNB-CU by the gNB-DU. The RRC Setup Complete message may include NCR indication information or corresponding information in the message. The NCR indication information can be used to indicate to the gNB-CU that the accessing device is an NCR device or to indicate the type of the UE is NCR.

After Step S37, the gNB-CU may be aware of the accessing device is an NCR device as contrary to the regular UE after receives the NCR indication information from the NCR-type UE. If the subsequent UE context setup/modification procedure is successfully complete, the gNB-DU can use a specific scheduling transmission strategy for the NCR device according to the understanding provided by the NCR indication information.

S38: After receives the RRC Setup Complete message from the NCR (via gNB-DU), since the gNB-CU is aware of the accessing device is an NCR device according to the received NCR indication information, the gNB-CU may select an AMF supporting NCR devices for the UE context establishment.

S39: After the selection, the gNB-CU may send an NGAP (NG Application Protocol) message, e.g., INITIAL UE MESSAGE, to the selected AMF, in order to request to setup UE context between the gNB and the 5G core network. The NGAP message may include the NCR indication information, where the NCR indication information can be used to indicate the accessing device is an NCR device or to indicate the UE type is NCR to the AMF.

S310: In a case that the NCR device is authorized by the selected AMF, the AMF may send the NGAP response message to the gNB-CU, e.g., INITIAL CONTEXT SETUP REQUEST message, to complete the UE context setup.

S311: After the gNB-CU receives the context setup request or context modifying request from AMF, the gNB-CU may send F1AP message to the gNB-DU, e.g., UE CONTEXT SETUP REQUEST or UE CONTEXT MODIFICATION REQUEST message, to setup or modify UE context at the gNB-DU. The NGAP message may include the NCR indication information, where the NCR indication information can be used to indicate the accessing device is an NCR device or to indicate the UE type is NCR to the AMF.

After the gNB-DU receives the NCR indication information from the gNB-CU, the gNB-DU is aware of the accessing device is an NCR device. If the subsequent UE context setup/modification procedure is successfully complete, the gNB-DU can use the specific scheduling transmission strategy for the NCR device according to the information in the NCR indication information.

S312: Finally, the procedure of setting up the UE context between the NCR device, the base station (gNB), and the core network (AMF) is complete. It should be noted that a UE context modifying procedure can be done by the similar approach, with the NCR indication information embedded in the message between the NCR device and the base station (gNB-DU and/or gNB-CU), and the core network (e.g. AMF). Such that the base station and the core network can understand that the accessing device is an NCR device, as contrary to a regular UE, or that the type of the UE is NCR.

According to the approach above, the NCR device can provide an NCR identification information to the base station or the component of the core network. The NCR identification information can be used to identify the type of the accessing device, such that the base station and the core network can understand that the accessing device is an NCR device, not a regular UE. Thereby, the base station and the core network may execute the appropriate procedure based on the identity of the accessing device. In this example, because the NCR identification information is first sent to the gNB-CU, not gNB-DU, the gNB-CU may include the NCR identification information (or corresponding information) in a message to the gNB-DU, such that gNB-DU can be aware of the type of the accessing device as an NCR device.

The methods/steps disclosed above can be performed by the UE, the BS, and the wireless communication device as disclosed in FIG. 5. Additionally, the hardware of the UE, the BS, and the wireless communication system may include non-transitory computer readable storage medium, storing one or more instructions. When the one or more instruction is executed by a processor, a wireless communication device is caused to perform the methods/steps as disclosed above.

Various exemplary embodiments of the present disclosure are described below with reference to the accompanying figures to enable a person of ordinary skill in the art to make and use the present disclosure. The present disclosure is not limited to the exemplary embodiments and applications described and illustrated herein. Additionally, the specific order and/or hierarchy of steps in the methods disclosed herein are merely exemplary approaches. Based upon design preferences, the specific order or hierarchy of steps of the disclosed methods or processes can be re-arranged while remaining within the scope of the present disclosure. Thus, those of ordinary skill in the art would understand that the methods and techniques disclosed herein present various steps or acts in exemplary order(s), and the present disclosure is not limited to the specific order or hierarchy presented unless expressly stated otherwise.

This disclosure is intended to cover any conceivable variations, uses, combination, or adaptive changes of this disclosure following the general principles of this disclosure, and includes well-known knowledge and conventional technical means in the art and undisclosed in this application.

It is to be understood that this disclosure is not limited to the precise structures or operation described above and shown in the accompanying drawings, and various modifications and changes may be made without departing from the scope of this application. The scope of this application is subject only to the appended claims.

The invention claimed is:

1. A wireless communication method, comprising:
transmitting, by a Distributed Unit (gNB-DU), Network-Controlled Repeater (NCR) support information to a Centralized Unit (gNB-CU); and
receiving NCR configuration information, by the gNB-DU from the gNB-CU, wherein the NCR support information comprises at least one of:
a list of one or more cells of the gNB-DU that have capability to support NCR access; or
a list of one or more cells of the gNB-DU that have no capability to support NCR access.

2. The method of claim 1, wherein the NCR configuration information further comprises at least one of:
an indication on whether NCR access is allowed to the one or more cells of the gNB-DU;
one or more indications on whether NCR access is respectively allowed to the one or more cells of the gNB-DU;
a list of one or more cells of the gNB-DU that are allowed to have NCR access; or
a list of one or more cells of the gNB-DU that are prohibited to have NCR access.

3. The method of claim 1, wherein the NCR support information is transmitted in a F1 interface setup request message, F1APa gNB-DU configuration update message, or a F1 Application Protocol (F1AP) message.

4. The method of claim 1, wherein the NCR configuration information is received from a F1 interface setup response message, gNB-DU configuration update acknowledge message, gNB-CU configuration update message, or a F1 Application Protocol (F1AP) message.

5. The method of claim 1, further comprising configuring whether NCR access is allowed to one or more cells by broadcasting information according to the NCR configuration information to trigger the one or more cells to broadcast cell NCR access information to one or more NCR devices for the one or more NCR devices to select an NCR-accessible cell.

6. The method of claim 1, further comprising:
broadcasting cell NCR access information, by the one or more cells, to indicate to one or more NCR devices of whether the one or more cells are accessible by the NCR devices; and
selecting one of the one or more cells that are NCR accessible according to cell NCR access information to access by an NCR device.

7. The method of claim 1, further comprising receiving NCR indication information from an NCR device, wherein the NCR indication information is used by the NCR device to identify the NCR device is an NCR terminal.

8. The method of claim 1, further comprising sending, by the NB-DU, an F1 AP message to the second gNB-CU, the F1AP message including NCR indication information, wherein the NCR indication information is used to identify an NCR device as an NCR terminal.

9. A wireless communication system, comprising a memory storing one or more programs and one or more processors electrically coupled to the memory and configured to execute the one or more programs to perform the method of claim 1;

wherein the gNB-DU is a distributed unit of a base station and the gNB-CU is a central unit of the base station.

10. A non-transitory computer-readable storage medium, storing one or more programs, the one or more program being configured to, when executed by one or more processors, cause to perform the method of claim 1.

11. A wireless communication method, comprising:

transmitting, by a Distributed Unit (gNB-DU), Network-Controlled Repeater (NCR) support information to a Centralized Unit (gNB-CU); and receiving NCR configuration information, by the gNB-DU from the gNB-CU, wherein the NCR configuration information includes at least one of:

a list of one or more cells of the gNB-DU that are allowed to have NCR access; or a list of one or more cells of the gNB-DU that are prohibited to have NCR access.

12. A wireless communication method, comprising:

receiving a Network-Controlled Repeater (NCR) support information from a Distributed Unit (gNB-DU) by a Centralized Unit (gNB-CU); and transmitting NCR configuration information, by the gNB-CU, to the gNB-DU, wherein the NCR configuration information includes at least one of:

a list of one or more cells of the gNB-DU that are allowed to have NCR access; or a list of one or more cells of the gNB-DU that are prohibited to have NCR access.

13. The method of claim 12, wherein the NCR support information comprises at least one of:

an indication on whether one or more cells of the gNB-DU have capability to support NCR access;

one or more indication on whether the one or more cells of the gNB-DU respectively have capability to support NCR access;

a list of one or more cells of the gNB-DU that have capability to support NCR access; or a list of one or more cells of the gNB-DU that have no capability to support NCR access.

14. The method of claim 12, further comprising determining whether to allow the one or more cells of the gNB-DU to have NCR access.

15. The method of claim 12, wherein the NCR support information is received from a F1 interface setup request message, F1APa gNB-DU configuration update message, or a F1 Application Protocol (F1AP) message.

16. The method of claim 12, wherein the NCR configuration information is transmitted in a F1 interface setup response message, gNB-DU configuration update acknowledge message, gNB-CU configuration update message, or a F1 Application Protocol (F1AP) message.

17. The method of claim 12, further comprising:

broadcasting cell NCR access information, by the one or more cells of the gNB-DU, to indicate to one or more NCR devices whether the one or more cells are accessible by the one or more NCR devices; and selecting one of the one or more cells that are NCR accessible according to cell NCR access information to access by an NCR device.

18. The method of claim 12, further comprising:

receiving, from the gNB-DU, an F1AP message by the gNB-CU, the F1AP message including NCR indication information, wherein the NCR indication information is used to identify an NCR device as an NCR terminal; and selecting, by the gNB-CU, an Access & Mobility Management Function (AMF) supporting NCR access according to the NCR indication information.

19. The method of claim 12, further comprising receiving, by the gNB-CU from an NCR device, NCR indication information, wherein the NCR indication information is used by the NCR device to identify the NCR device is an NCR terminal;

wherein the NCR indication information is transmitted in an RRC (Radio Resource Control) setup complete message from the NCR device.

20. A wireless communication method, comprising:

receiving a Network-Controlled Repeater (NCR) support information a from first wireless communication node by a Centralized Unit (gNB-CU); and transmitting NCR configuration information, by the gNB-CU, to the gNB-DU, wherein the NCR support information comprises at least one of:

a list of one or more cells of the gNB-DU that have capability to support NCR access; or a list of one or more cells of the gNB-DU that have no capability to support NCR access.

* * * * *